Aug. 7, 1928.
J. H. WAGENHORST
AUTOMOBILE WHEEL
Filed July 6, 1925
1,679,453
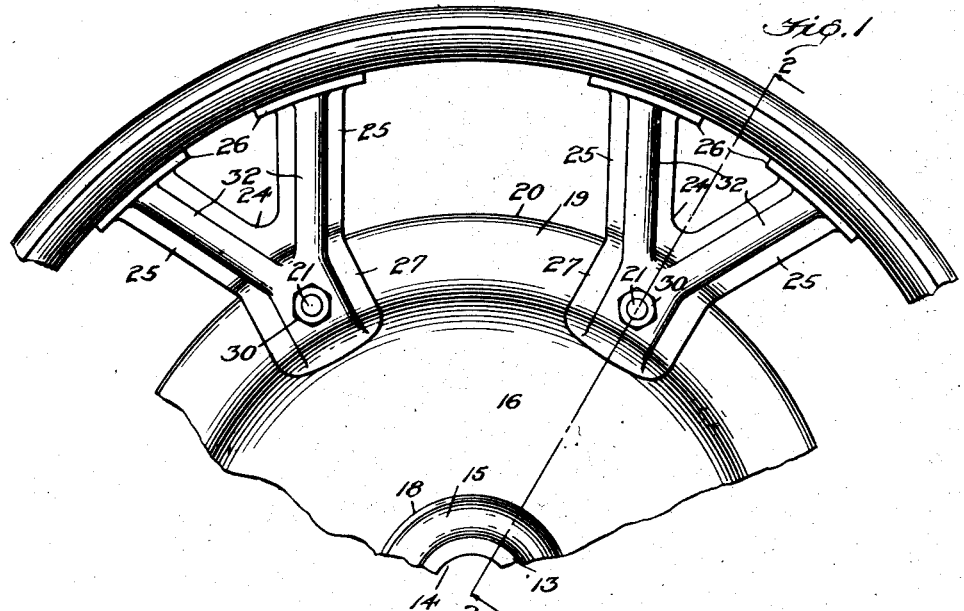
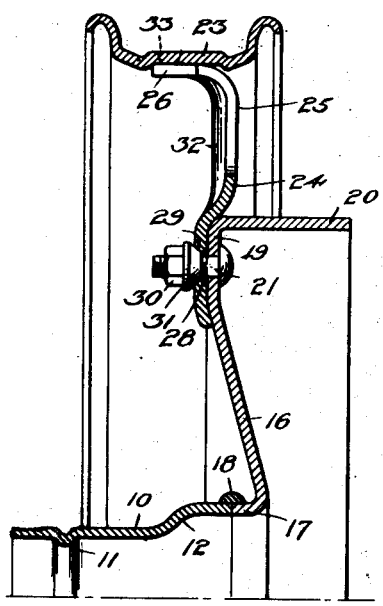
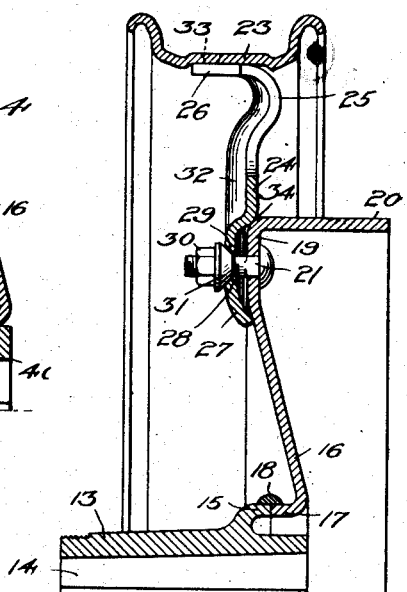

Patented Aug. 7, 1928.

1,679,453

UNITED STATES PATENT OFFICE.

JAMES H. WAGENHORST, OF JACKSON, MICHIGAN.

AUTOMOBILE WHEEL.

Application filed July 6, 1925. Serial No. 41,835.

My invention relates to improvements in automobile wheels and has to do, more particularly, with automobile wheels having demountable rims and in which the brake drum constitutes the major portion of the wheel body.

My present invention is an improvement upon the invention set forth and claimed in my pending application for United States Letters Patent for improvements in vehicle wheels, Serial No. 726,529, filed July 17, 1924. In the said application, I have disclosed a wheel construction in which the brake drum constitutes a major portion of the wheel body and the demountable rim is detachably connected to said brake drum by means of securing lugs or members rigidly attached to the rim and releasably connected to the brake drum. The common use of four-wheel brakes on automobiles requires the use of brake drums on all four wheels and there is a decided advantage in connecting the demountable rim to the brake drum directly, as this permits the elimination of the usual wheel body with a consequent decrease in weight and cost. Furthermore, this construction renders it particularly easy to examine and adjust the braking mechanism when the demountable rim is removed.

Heretofore, the usual practice has been to bolt the brake drum to a radial flange on the wheel hub or to the wheel body. The chief object of my present invention is to simplify the wheel construction and decrease the weight and cost of manufacture of the same. A further object of my invention is to provide a simplified wheel construction in which the brake drum forms the body portion of the wheel and in which identical brake drums are rigidly and permanently connected to either a front wheel hub or a rear wheel hub. A further object of my present invention is to provide an improved connection between the demountable rim and the brake drum.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings, forming a part of this specification, in which:—

Figure 1 is a fragmentary view, in front elevation, of a rear wheel embodying my invention;

Fig. 2 is a radial, sectional view of the wheel taken on line 2—2 of Fig. 1;

Fig. 3 is a similar, radial sectional view of a front wheel;

Fig. 4 is a detail sectional view illustrating a slightly modified connection between the brake drum and a rear hub; and Fig. 5 is a similar sectional view illustrating this modified construction used to connect the brake drum to a front hub.

In the drawings, the same reference numerals refer to the same parts throughout the several views, and the sectional views are taken looking in the direction of the arrows at the ends of the section lines.

The brake drums used on automobile wheels are commonly sheet metal stampings and frequently the front wheel hubs are also pressed from sheet metal. The rear wheel hubs, however, due to the splines, grooves and the like, needed to effect a driving connection between the hub and the axle shaft, are usually malleable castings. Notwithstanding this, I propose to provide brake drums, front hubs and rear hubs which are so formed that the same brake drum may be connected either to a front wheel hub or a rear wheel hub. This results in a decided economy in manufacture and in a much simpler and lighter wheel construction.

Referring to the numbered parts of the drawings, I have shown a front wheel hub 10, which is formed of pressed metal and has a rib 11, and a shoulder 12, formed therein to serve as locating shoulders for the usual front wheel bearings. The rear wheel hub 13, which may be a steel forging, has a tapered bore 14 therein to receive the end of the axle shaft. Near the rear end of the hub 13 there is formed a flange 15 which extends parallel to but is spaced from the body of the hub. The free end of the flange 15 is of the same diameter as the rear end of the front hub 10. The brake drum 19 has its body portion 16 dished rearwardly and provided with a cylindrical central flange 17 of the same diameter as the rear end of the front hub and the flange 15 of the rear hub. The brake drum has the usual flange 20 providing the braking surface. The brake drum is rigidly and permanently attached to the hub, either front hub or rear hub, by bringing the edge of the flange 17 against the rear end of the front hub or the edge of the flange 15 of the rear hub and butt-welding the parts together, as indicated at 18. The dishing rearwardly of the brake drum, at 16, helps to strengthen it and make it more effective to resist the radial strains transmitted to it due to the attachment of the demountable rim thereto.

The demountable rim 23 has a plurality of securing lugs or members 24 rigidly attached thereto. As shown, these members are Y-shaped, having the diverging portions 25 which terminate in the flanges 26 engaging the inner face of the demountable rim and secured thereto by means of studs 33 extending from said flanges through openings in the base of the rim and riveted over. The radial parts 27 of each Y-shaped member engages the periphery of the brake drum, as at 34, and has a bolt hole 28 with a conical recess 29 at its forward end. The studs 21 carried by the brake drum extend through the bolt holes 28 and nuts 30 are screwed upon said studs until the conical shoulders 31 of the nuts seat in said conical recesses 29. The securing members 24 may be ribbed, as at 32, to strengthen them. This rib 32 also co-operates with the nut 30 and stud 21 to keep the nut tight. Due to the rib 32, the nut 30 engages a portion of the securing member 24, which is spaced from the brake drum. The portion 27 of the securing member contacts with the brake drum alongside of and above and below the nut 30 and, when the nut is screwed up, the pressure exerted by it causes the intermediate spaced portion of the securing member to yield slightly, thus setting up a reaction on the nut like that of a spring washer and tending to keep the nut tight. The engaging of the securing member 24 with the brake drum at 34 transmits load strains directly to the brake drum in line with the wall 19 thereof. This provides for an effective transmission of the load strains.

In Figs. 4 and 5, I have shown a modified form of my invention in which the front wheel hub is substantially the same as that shown in Fig. 3. The hub 35 has the shoulder 36 formed therein to locate one of the front wheel bearings. The brake drum 16 has the central cylindrical flange 37 terminating in the portion 38 formed to fit the shoulder 36 of the hub. The hub 35 fits inside of the flange 37, as shown in Fig. 4, and is rigidly secured thereto by rivets 39.

The exterior of the rear part of the rear hub 40 is formed so that it conforms to the rear part of the front hub 35, having a shoulder 41 identical with the shoulder 36 of the front hub. The cylindrical flange 37 on the brake drum fits over either front or rear hub, as shown. To connect the brake drum to the rear hub, I may form small hemispherical cavities in the outer surface of the hub and press the metal of the flange 37 into them as indicated at 42.

Certain features of construction disclosed but not claimed herein, are disclosed and claimed in my application Serial No. 180,479, for improvements in automobile wheels, filed April 2d, 1927, as a division of this application.

I am aware that the construction disclosed herein may be changed considerably without departing from the spirit of my invention and, therefore, I claim my invention broadly, as indicated by the appended claims.

Having thus described my invention, what I claim as new and useful and desire to secure by Letters Patent is:—

1. A wheel comprising a hub having a rear portion of larger diameter than the body of the hub and a brake drum having a central cylindrical flange the forward edge of which engages and is rigidly connected to the rear edge of said rear portion.

2. A wheel comprising a hub having a rear portion of larger diameter than the body of the hub and a brake drum having a central cylindrical flange, the forward edge of which engages and is butt-welded to the rear edge of said rear portion.

JAMES H. WAGENHORST.